United States Patent
Depots et al.

(10) Patent No.: US 9,442,035 B2
(45) Date of Patent: Sep. 13, 2016

(54) DEVICE FOR CLASSIFYING STRAIN GAUGES

(75) Inventors: Emmanuel Depots, Chaumes en Brie (FR); Stéphane Clemot, Vaux le Penil (FR); Stéphane Rousselin, Hericy (FR); Etienne Tulie, Soisy sur Seine (FR); Sébastien Voisin, Charenton le Pont (FR)

(73) Assignee: SNECMA, Paris (FR)

( * ) Notice: Subject to any disclaimer, the term of this patent is extended or adjusted under 35 U.S.C. 154(b) by 175 days.

(21) Appl. No.: 14/125,002

(22) PCT Filed: May 30, 2012

(86) PCT No.: PCT/FR2012/051209
§ 371 (c)(1),
(2), (4) Date: Dec. 9, 2013

(87) PCT Pub. No.: WO2012/168626
PCT Pub. Date: Dec. 13, 2012

(65) Prior Publication Data
US 2014/0123726 A1    May 8, 2014

(30) Foreign Application Priority Data

Jun. 9, 2011  (FR) ...................... 11 55047

(51) Int. Cl.
*G01P 21/00* (2006.01)
*G01C 21/00* (2006.01)
*G01L 27/00* (2006.01)
(Continued)

(52) U.S. Cl.
CPC ............ *G01L 25/00* (2013.01); *G01C 25/005* (2013.01); *G01L 27/005* (2013.01); *G01P 21/00* (2013.01)

(58) Field of Classification Search
CPC .... G01C 25/005; G01L 27/005; G01P 21/00
See application file for complete search history.

(56) References Cited

U.S. PATENT DOCUMENTS

| 2,788,654 | A | * | 4/1957 | Wiancko | ................. | G01P 21/00 |
| | | | | | | 73/1.38 |
| 2,901,905 | A | * | 9/1959 | Horst | ........................ | G01L 1/22 |
| | | | | | | 338/3 |
| 3,164,978 | A | * | 1/1965 | Sharman | .............. | G01C 25/005 |
| | | | | | | 73/1.77 |

(Continued)

FOREIGN PATENT DOCUMENTS

GB          2 285 865        7/1995

OTHER PUBLICATIONS

Radial Blade Exhauster. [online]. Cincinnati Fan: OEM and Industrial Air Handling Specialist, Catalog No. RBE-307, Aug. 10, 2010 [retrieved on Dec. 9, 2013]. Retrieved from the Internet: <URL: http://www.cincinnatifan.com/catalogs/RBE604-internet.pdf>.

(Continued)

*Primary Examiner* — David A Rogers
(74) *Attorney, Agent, or Firm* — Pillsbury Winthrop Shaw Pittman LLP

(57) ABSTRACT

A device for classifying strain gauges includes a holder capable of receiving strain gauges and capable of being rotated by a rotating device, the holder being connected to the rotating device by a linking device; and a heater capable of heating the holder and arranged about the mounting, the linking device including a cooling device capable of limiting the heating of the rotating device.

12 Claims, 1 Drawing Sheet

(51) Int. Cl.
*G01L 25/00* (2006.01)
*G01C 25/00* (2006.01)

(56) References Cited

U.S. PATENT DOCUMENTS

| | | | | |
|---|---|---|---|---|
| 3,277,726 A * | 10/1966 | Simmons | ............... | G01P 21/00 73/1.38 |
| 3,372,572 A * | 3/1968 | Campbell | ............... | G01P 21/00 73/1.87 |
| 3,470,730 A * | 10/1969 | Fujitsubo | ............... | G01P 21/00 73/1.38 |
| 3,570,315 A * | 3/1971 | Likeness et al. | ....... | G01P 21/00 73/1.38 |
| 3,583,205 A * | 6/1971 | Erle | ............... | F16C 32/0622 384/100 |
| 3,956,919 A | 5/1976 | Vranas | | |
| 4,426,874 A * | 1/1984 | Moore | ............... | G01L 25/00 374/1 |
| 5,353,642 A * | 10/1994 | Hasegawa | ............... | G01P 21/00 73/1.38 |
| 6,196,048 B1 * | 3/2001 | Kunimi | ............... | G01P 21/00 33/366.12 |
| 6,560,553 B1 * | 5/2003 | Hirobe | ............... | G01P 21/00 702/94 |
| 8,661,872 B2 * | 3/2014 | Brocker | ............... | G01P 21/00 374/45 |
| 2003/0144808 A1 * | 7/2003 | Savard | ............... | G01P 21/00 702/104 |
| 2007/0204672 A1 * | 9/2007 | Huang | ............... | G01P 21/00 73/1.88 |
| 2010/0073011 A1 * | 3/2010 | Svidenko | ............... | G01J 1/02 324/537 |
| 2012/0215474 A1 * | 8/2012 | Bentley | ............... | G01C 25/005 702/92 |
| 2014/0083160 A1 * | 3/2014 | Flooks | ............... | G01P 21/00 73/1.38 |

OTHER PUBLICATIONS

International Search Report as issued for International Application No. PCT/FR2012/051209, dated Aug. 20, 2012.

* cited by examiner

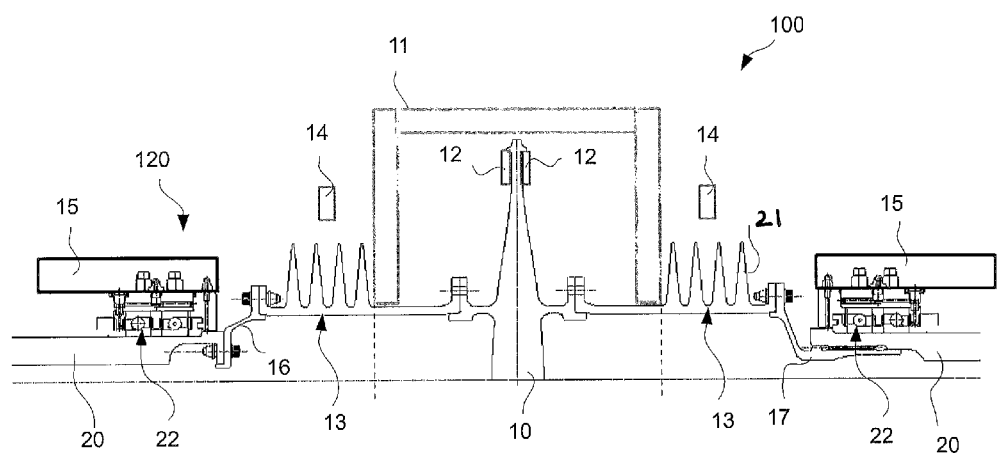

DEVICE FOR CLASSIFYING STRAIN GAUGES

CROSS-REFERENCE TO RELATED APPLICATIONS

This is the U.S. National Stage of PCT/FR2012/051209, filed May 30, 2012, which in turn claims priority to French Patent Application No. 1155047, filed Jun. 9, 2011, the entire contents of all applications are incorporated herein by reference in their entireties.

FIELD

The present invention relates to a device for classifying strain gauges, and particularly strain gauges intended to be mounted on rotating parts such as parts constituting a turbine engine.

BACKGROUND

Deformation gauges, also known as strain gauges, are resistance wire extensometers that make it possible to measure the deformation of a part by variation of the electrical resistance of the gauge (the electrical resistance increasing with the lengthening of the gauge).

These gauges are electric circuits bonded onto the parts to be studied and thus undergo a deformation similar to the deformation of the part placed under stress.

The measurement value of the gauge strongly depends on the design of the gauge but also on the linking by bonding of the gauge on the part to be studied. This linking must not vary over time (absence of viscosity) and must withstand the environment in which the gauges are placed.

In certain highly technological fields, such as for example the aeronautics field, such gauges are used to monitor the deformations and the mechanical stresses undergone by turbine engine parts during validation.

When these gauges are mounted on the rotating parts of an aeronautic turbine engine, they are subjected to important thermal stresses (of the order of 1100° C.) but also to important centrifugal stresses (the rotation speed being of the order of 20,000 rpm). Before using them for motor tests, it is thus necessary to be able to certify them and to assure that the gauges and the materials used for the linking by bonding can withstand such stresses.

However, the current approach is to dimension the strain gauges by means of empirical rules and the choice of materials to achieve the linking by bonding of the gauge is guided uniquely by the mechanical characteristics (temperature limits, etc.) given by the manufacturer.

In this context, the current method of dimensioning gauges does not make it possible to guarantee their resistance in particular conditions of operating turbine engines (i.e. with temperature stresses combined with important centrifugal stresses).

Thus, it may happen that such gauges made to rotate and under high temperature unfasten during a test. The loss of the gauge consequently implies the loss of the measurement, and occasionally multiple damage inside the turbine engine.

Furthermore, the current trend is to develop the use of strain gauges during test phases in order to recover the maximum of information, which results in a multiplication of the number of gauges in place in a turbine engine during a test. The multiplication of the number of strain gauges multiplies accordingly the risks of loss of measurement and degradation of the turbine engine, consequently implying an important risk of perturbation of test campaigns by untimely stoppages of the test and/or by the handling of the turbine engine.

SUMMARY

In this context, the invention aims to propose a device for classifying strain gauges aiming to classify the gauges as well as the bonding materials used in conditions similar to the operating conditions of the turbine engine.

To this end, the invention proposes a device for classifying strain gauges comprising:

a holder capable of receiving strain gauges and capable of being rotated by rotating means, said holder being connected to the rotating means by a linking means;

a temperature setting means capable of heating said holder and arranged about said holder;

said linking means comprising cooling means capable of limiting the heating of said rotating means.

Thus, the device according to the invention makes it possible to test and certify the gauges as well as the materials assuring the linking by bonding in conditions close to the conditions of use of the test turbine engines.

Thanks to the device according to the invention, it is possible to carry out tests combining a setting of temperature with a placing in rotation of the gauges so as to classify different technologies of gauges and fastening means.

Thus, the device according to the invention makes it possible to reduce the risks of damaging the test turbine engines through a precise knowledge of the mechanical characteristics of each technology.

The device for classifying strain gauges according to the invention may also have one or more of the characteristics below, considered individually or according to any technically possible combinations thereof:

said linking means comprises a means capable of enabling the expansion of said linking means under the effect of the increase in temperature of said linking means without placing under stress said rotating means;

said holder is rotably driven by two transmission shafts arranged on either side of said holder;

said temperature setting means are formed of an oven heating by radiation;

said cooling means are arranged on either side of said temperature setting means so as to limit the propagation of heat by conduction to said rotation means;

the means of cooling said linking means are formed of a plurality of cooling fins;

said device comprises secondary cooling means capable of improving the cooling of said cooling fins;

said secondary cooling means are formed of generators blowing air onto said cooling fins;

said holder is a disc.

BRIEF DESCRIPTION OF THE DRAWING

Other characteristics and advantages of the invention will become clearer from the description that is given thereof below, by way of indication and in no way limiting, with reference to FIG. 1, illustrating a sectional view of an example of embodiment of a device for classifying strain gauges according to the invention.

DETAILED DESCRIPTION

Referring to FIG. 1, the device for classifying strain gauges 100 is formed of a holder 10, advantageously of circular shape such as a disc, intended to receive the strain gauges 12 to be classified. The strain gauges 12 are positioned on the lateral surfaces of the disc. The holder 10 is rigidly fixed on either side of a transmission shaft 20. Transmission shafts 20 are conventionally positioned axially and radially by one or more ball bearings 22 fixed in a casing 15, the casing 15 being connected to the frame of the device 100. The assembly thereby constituted forming means of rotating 120 the disc holder 10.

To rotably drive the disc holder 10 at a desired rotation speed, one of the two transmission shafts 20 is coupled to a motor, such as for example an electric motor (not represented). In order to represent the conditions of the turbine engines, the motor must be able to drive the disc at a rotation speed of the order of 20,000 rpm.

The disc holder 10 is made of a material resistant to centrifugal stress (rotation of the order of 20,000 rpm) and to temperature stress (of the order of 700-800° C.). To this end, the disc 10 is made for example of Inconel.

The device for classifying 100 comprises means of setting the temperature of the strain gauges 12. These means are formed of an oven 11, heating by radiation, encompassing the disc holder 10. The oven thus makes it possible to adapt the heating temperature to the temperature at which it is wished to test the gauges, for example of the order of 1100° C. to represent the test conditions of a turbine engine.

According to the embodiment illustrated in the unique figure, the oven 11 is constituted of two parts that are assembled around the disc holder 10 while enabling a free rotation of the disc holder 10.

In order to avoid a propagation of heat from the oven to the other parts of the device 100 and particularly to the bearings 22, by heat conduction, the device 100 comprises cooling means 13 arranged on either side of the disc holder 10. The cooling means 13 are rigidly fixed to the disc holder 10 by screwing.

The cooling means 13 are arranged such that they surround the lateral walls of the oven so as to avoid hot air leaks which could overheat the other parts of the device 100 by convection or by conduction.

The cooling means 13 are formed of a succession of radial fins 21 making it possible to have an important heat exchange surface with the surrounding air.

Advantageously, and to improve the cooling of the device 100, it is envisaged to position cold generators such as for example canons 14 or nozzles blowing cold air in the direction of the radial fins 21. According to a particular embodiment of the invention, the air canons 14 are vortex tubes, also known as Ranque-Hilsch tubes. Thus, the cooling means 13 combined with the vortex tubes 14 make it possible to maintain a suitable temperature at the level of the bearings, in other words at a temperature below the limit temperature of use of the oil serving to lubricate the bearings, which is of the order of 100° C., and advantageously of the order of 50° C.

The device for classifying 100 also comprises two connecting flanges 16 and 17 making it possible to rigidly fix the cooling means and the disc holder 10 to the transmission shafts 20.

According to the advantageous embodiment illustrated, the first connecting flange 16 is rigidly connected to the cooling means and to a transmission shaft 20 by screwing. The second connecting flange 17 comprises a splined connection between the second connecting flange and the transmission shaft 20 and is rigidly connected more conventionally by screwing to the cooling means.

The splined connection thus makes it possible to allow any expansions of the parts on the alignment of the transmission shafts without placing the parts under mechanical stresses, which would be detrimental to their lifetime.

The choice of the radius of fastening of the gauges on the lateral walls of the disc 10 is made by the operator while taking into account their desired specific mass, rotating speeds and temperatures while carrying out the test.

Thus, the device according to the invention has the advantage of minimising the risks of damaging a test motor by the prior classification of the gauges but also the materials used for their bonding.

The device also has the advantage of enabling an easy, rapid comparison and in the same test conditions of different technologies of gauges and fastening means.

The invention claimed is:

1. Device for classifying strain gauges comprising:
   a holder capable of receiving strain gauges and capable of being rotated about a rotation axis by a rotating device, said holder being connected to the rotating device by a linking device;
   a heater capable of heating said holder and arranged about said holder;
   said linking device comprising a cooler capable of limiting the heating of said rotating device, wherein the cooler comprises a plurality of cooling fins that are each arranged at a different position along the rotation axis so that a first of the plurality of cooling fins is provided farther away from the heater than a second of the plurality of cooling fins.

2. Device for classifying strain gauges according to claim 1, wherein said linking device comprises a device capable of allowing the expansion of said linking device under the effect of the increase in temperature of said linking device without placing under stress said rotating device.

3. Device for classifying strain gauges according to claim 1, wherein said heater is formed of an oven heating by radiation.

4. Device for classifying strain gauges according to claim 1, comprising a secondary cooler capable of improving the cooling of said cooling fins.

5. Device for classifying strain gauges according to claim 4, wherein said secondary cooler is formed of generators blowing air onto said cooling fins.

6. Device for classifying strain gauges according to claim 1, wherein said holder is a disc.

7. Device for classifying strain gauges according to claim 1, wherein the linking device includes two connecting flanges.

8. Device for classifying strain gauges according to claim 1, wherein the rotating device includes a transmission shaft and one or more ball bearings.

9. Device for classifying strain gauges according to claim 1, wherein said holder is rotably driven by two transmission shafts arranged on either side of said holder.

10. Device for classifying strain gauges according to claim 1, wherein said plurality of cooling fins extend radially away from the rotation axis.

11. Device for classifying strain gauges comprising:
   a holder capable of receiving strain gauges and capable of being rotated by a rotating device, said holder being connected to the rotating device by a linking device;
   a heater capable of heating said holder and arranged about said holder;
   said linking device comprising a cooler capable of limiting the heating of said rotating device, wherein said linking device comprises a device capable of allowing the expansion of said linking device under the effect of the increase in temperature of said linking device without placing under stress said rotating device, and wherein said holder is rotably driven by two transmission shafts arranged on either side of said holder.

12. Device for classifying strain gauges comprising:

a holder capable of receiving strain gauges and capable of being rotated by a rotating device, said holder being connected to the rotating device by a linking device;

a heater capable of heating said holder and arranged about said holder;

said linking device comprising a cooler capable of limiting the heating of said rotating device, wherein said cooler is arranged on either side of said heater so as to limit the propagation of heat by conduction to said rotating device.

* * * * *